(12) United States Patent
Wiesinger et al.

(10) Patent No.: US 8,127,921 B2
(45) Date of Patent: Mar. 6, 2012

(54) PACKAGE FOR AN OPTICAL STORAGE MEDIUM

(75) Inventors: Bernhard Wiesinger, Salzburg (AT); Marcel Penning, Adnet (AT); Anton Brandauer, Kuchl (AT)

(73) Assignee: Sony DADC Austria AG, Anif (AT)

( * ) Notice: Subject to any disclaimer, the term of this patent is extended or adjusted under 35 U.S.C. 154(b) by 267 days.

(21) Appl. No.: 12/559,161

(22) Filed: Sep. 14, 2009

(65) Prior Publication Data

US 2010/0096283 A1 Apr. 22, 2010

(30) Foreign Application Priority Data

Oct. 20, 2008 (EP) .................................... 08018341

(51) Int. Cl.
*B65D 85/57* (2006.01)

(52) U.S. Cl. ......... 206/312; 206/308.1; 53/411; 53/460; 229/68.1; 229/921

(58) Field of Classification Search ................. 206/307, 206/308.1, 309, 310, 311, 312, 778, 232; 53/411, 455, 460; 229/68.1, 92, 92.1, 92.3, 229/72, 921
See application file for complete search history.

(56) References Cited

U.S. PATENT DOCUMENTS

| | | | | |
|---|---|---|---|---|
| 5,908,109 A * | 6/1999 | Muto | | 206/308.1 |
| 6,629,600 B2 * | 10/2003 | Cinquina | | 206/312 |
| 6,845,865 B2 * | 1/2005 | Wynalda et al. | | 206/308.1 |
| 2003/0111368 A1 | 6/2003 | Wynalda, Jr. et al. | | |
| 2004/0256256 A1 * | 12/2004 | Preece | | 206/308.1 |
| 2006/0006080 A1 * | 1/2006 | Gustafsson et al. | | 206/308.1 |
| 2008/0103940 A1 * | 5/2008 | Rosenkranz | | 705/28 |

FOREIGN PATENT DOCUMENTS

| | | |
|---|---|---|
| AT | 009 787 U1 | 3/2008 |
| DE | 297 13 090 U1 | 11/1997 |
| DE | 20 2005 019 161 U1 | 3/2006 |
| EP | 1 772 869 A2 | 4/2007 |
| EP | 1 916 661 A2 | 4/2008 |
| WO | WO 01/25097 A1 | 4/2001 |
| WO | WO 2007/088316 A1 | 8/2007 |

* cited by examiner

*Primary Examiner* — Luan K Bui

(74) *Attorney, Agent, or Firm* — Oblon, Spivak, McClelland, Maier & Neustadt, L.L.P.

(57) ABSTRACT

A package for an optical storage medium, comprising first and second parts; a window located in the first part; a third part sandwiched in a region between the first and second parts; wherein the first, second and third parts define a receptacle in a further region where the third part is not sandwiched between the first and second parts; wherein the window and the third part are arranged such that when the optical storage medium is placed in the receptacle, the optical storage medium abuts the third part and a predefined area of the optical storage medium is perceptible through the window.

15 Claims, 7 Drawing Sheets

PACKAGE FOR AN OPTICAL STORAGE MEDIUM

An embodiment of the invention relates to a package for an optical storage medium. A further embodiment of the invention relates to a product comprising a package and an optical storage medium. A further embodiment of the invention relates to a method for manufacturing a product comprising a package and an optical storage medium.

BACKGROUND

One goal when designing a package for an optical storage medium is that the optical storage medium can be sent, e.g. by mail, to a customer. Another goal is to design it such that it raises the customer's interest. Further, it is desirable that the package can be manufactured and sent at low costs.

BRIEF SUMMARY

It is an object of the invention to provide a package for an optical storage medium which may fulfill some of these criteria. A further object is to provide a method for manufacturing a respective product.

Theses objects are solved by a package for an optical storage medium, and by a method for manufacturing according to the attached claims.

Further details of the invention will become apparent from a consideration of the drawings and the ensuring description.

BRIEF DESCRIPTION OF THE SEVERAL VIEWS OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description.

The elements of the drawings are not necessarily to scale relative to each other. Like reference numerals designate corresponding similar parts.

DETAILED DESCRIPTION

In the following, embodiments of the invention are described. It is important to note, that all described embodiments may be combined in any way, i.e. there is no limitation that certain described embodiments may not be combined with others. Further, the features of the various embodiments described herein may be combined with each other, unless specifically noted otherwise. It is further to be understood that other embodiments may be utilized, and that structural or logical changes may be made without departing from the scope of the invention. The following detailed description, therefore, is not to be taken in a limiting sense, and the scope of the present invention is defined by the appended claims.

Figure 1:
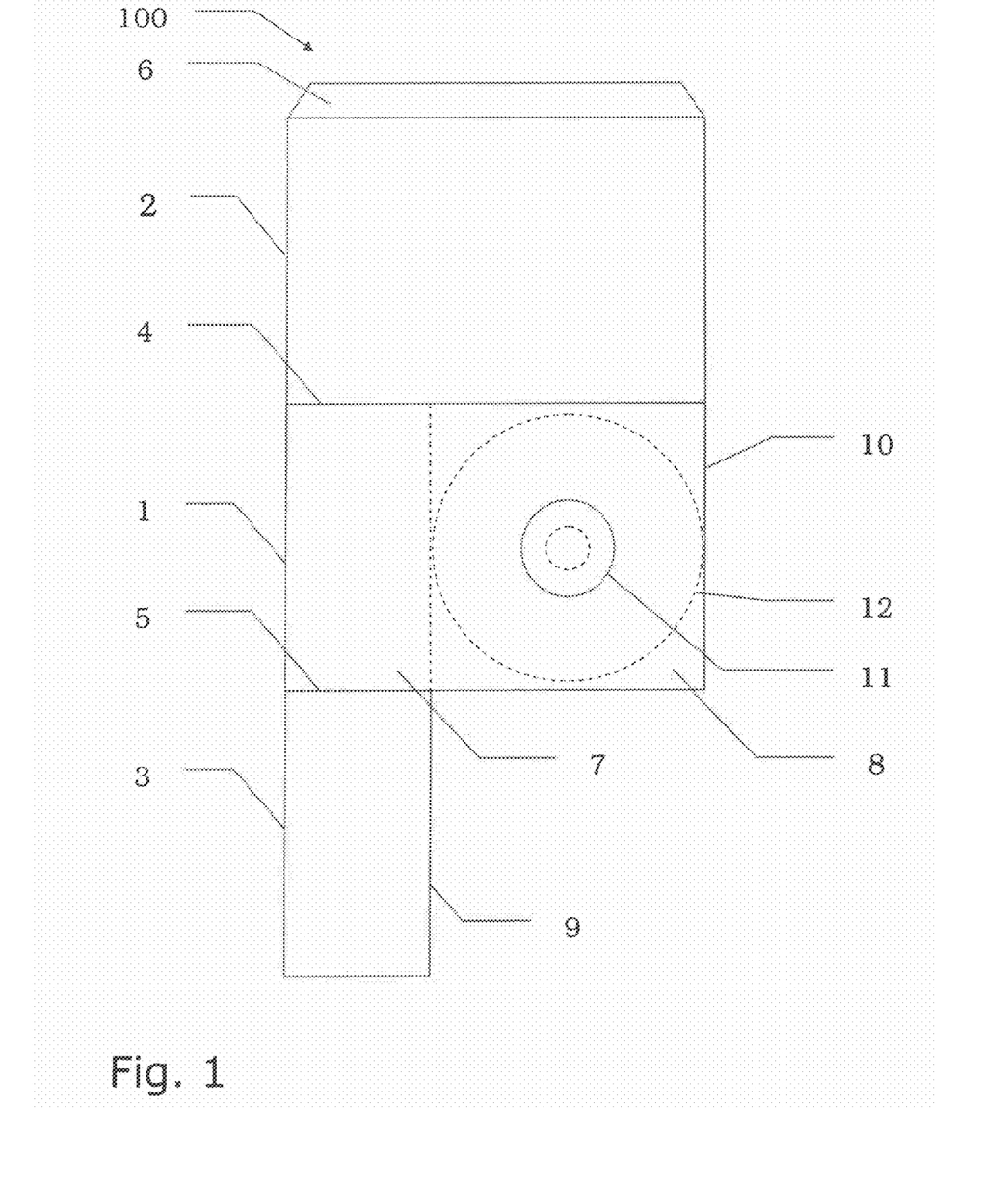
FIG. 1 illustrates an embodiment of a package in an unfolded state.

FIG. 1 shows an embodiment of a package 100 for an optical storage medium in an unfolded state. Package 100 has a first part 1, a second part 2, and a third part 3.

First parts 1 and 2 may be formed of cardboard, paper or plastic and may be, as illustrated, of a substantially rectangular shape. Both parts may be of approximately the same size. Third part 3 may be made of the same or alternatively of a different material and may be of a smaller size than first and second parts 1, 2.

When folding package 100 at folding lines 4 and 5, third part 3 can be sandwiched between first part 1 and second part 2. Thereby, third part 3 may come to lie between first and second parts 1, 2, and may be entirely covered by first and second parts 1, 2. In a further embodiment, third part 3 may be a bit overlapping e.g. on the left side in FIG. 1 thereby forming a flap or lug for gluing.

For assembling, a flap 6 (adhesive tongue) may be provided, e. g. adjacently to second part 2.

By sandwiching the third part 3 between first and second part 1, 2, a sandwiched region 7 and a non-sandwiched region 8 of first part 1 are formed. In sandwiched region 7, first, second and third parts 1, 2, 3 may overlap, such that sandwiched region 7 may also be referred to as overlapping region. In non-sandwiched region 8, however, third part 3 may not overlap first part 1 and/or second part 2, such that non-sandwiched region 8 may be referred to as non-overlapping region.

Third part 3 may be fixed to first and second parts 1, 2 in sandwiched region 7 by an adhesive.

By sandwiching third part 3 in sandwiched region 7 between first and second parts 1, 2, a receptacle (cavity) is formed in non-sandwiched region 8. The receptacle may be bordered on a first side by non-sandwiched region 8 of first part 1 and on a second side by a corresponding region of second part 2. Laterally, the receptacle may be bordered by third part 3, which forms a bed stop 9. Further laterally, the receptacle may be bordered by folding lines between first and second parts 1, 2 and second part 2 and flap 6.

An insertion slot 10, forming an opening of the receptacle, may further be provided on a lateral side of the receptacle, e.g. opposite to the side where bed stop 9 is provided. For providing insertion slot 10, lateral cutting edges of first and second parts 1, 2 may be left open. In a further embodiment, the flap could also just cover the part of the sandwiched region 7 so that an opening of the receptacle may be conveniently formed on the side of the package facing towards the bottom in the drawing plane of FIG. 1.

In non-sandwiched region 8 of first part 1, a window 11 may be provided. Window 11 may be formed of a hole or cutout provided in first part 1 and may be arranged such that it does not, or not entirely, overlap third part 3. When an optical storage medium 12 (not shown in FIG. 1, but identified by a dotted line indicating its circumference) is inserted in the receptacle through insertion slot 10, a predetermined region of the optical storage medium may thus be perceptible, i.e. visible, through window 11.

Window 11 thereby may allow perceiving (seeing) at least a part of the surface of optical storage medium 12 when placed inside the receptacle, e.g. by a customer who receives package 100 via mail. It is thus possible to attract the customer's attention to optical storage medium 12 included in package 100.

It is further possible to provide a second window arranged in second part 2, for example overlapping window 11 of first part 1 in non-sandwiched region 8. Thereby, optical storage medium 12 is visible from both sides of package 100 and can be easily recognized by the customer.

Third part 3, when sandwiched between first and second parts 1, 2, may be arranged such that optical storage medium 12, when fully inserted through insertion slot 10, abuts third part 3 at bed stop 9. An external bordering circumference of optical storage medium 12 thereby comes to lie adjacently to third part 3 and touches its border at bed stop 9. With bed stop 9, optical storage medium 12 may therefore be placed in a well-defined position inside the receptacle.

A size and shape of the receptacle, corresponding to a size and shape of non-sandwiched region 8, may be determined such that the receptacle entirely accommodates optical storage medium 12. For example, a longitudinal and lateral extension of the receptacle, if provided in a rectangular form, may be chosen larger than a largest diameter of optical storage medium 12. In this case, optical storage medium 12 may be fully covered by first part 1 and second part 2. If, for example, optical storage medium 12 is of circular shape and has a diameter of about 120 mm, non-sandwiched region 8 may have longitudinal and lateral extensions of at least 120 mm.

A shape and size of third part 3 may be chosen such that it fully extends along a lateral extension of first and second parts 1, 2. This allows the receptacle to be entirely closed to the side of third part 3. Further the third part strengthens the package leading to a firm and solid design of package 100. This effect may also be achieved with third part 3 only partly extending along the lateral extension of first and second parts 1, 2.

Thus, third part 3 may also be chosen smaller in size than shown in FIG. 1, e.g. such that it only extends in a small region forming bed stop 9. For example, third part 3 may only extend in a region where optical storage medium 12, when inserted in the receptacle, abuts. In this case, third part 3 may for example be formed of a small double-faced adhesive tape forming bed-stop 9.

The size and shape of first and second parts 1, 2 may be chosen such that package 100, in a folded state, has about a standard size. This standard size may correspond to mailing standards, as for example the US standard letter size or German "Standardbrief" with a length between 140 and 235 mm and a width between 90 and 125 mm. Of course, other foreign mailing standards may also be respected. Alternatively or in addition, longitudinal and lateral extensions of first and second parts 1, 2 may be chosen to correspond to further standard package sizes, such as the size of a standard DVD (digital versatile disc) box with a height of 191 mm and a width of 125 mm, or a standard CD (compact disc) envelope. In other words, various kinds of mailing and/or packaging standards may be used for designing first and second parts 1, 2.

As a material for providing first and second parts 1, 2, a cardboard or paper may be chosen in accordance with optic, haptic and stiffness requirements as well as cost, weight and thickness demands. For example, the weight of the cardboard or paper may be of about 240 g/m$^2$ or 280 g/m$^2$. The package is very flexible in this respect easily fulfilling desired demands.

As shown in the embodiment of FIG. 1, first and second parts 1, 2 may be integrally formed of a single piece of cardboard or paper. Further, also third part 3, as well as flap 6, may be integrally formed of the same piece of cardboard or paper.

Alternatively, if third part 3 is not integrally formed by the single piece of cardboard or paper forming first and second parts 1, 2, its material may be selected independently. The material may be selected depending on its thickness. The thickness of third part 3 may, for example, be chosen such that it substantially corresponds to a thickness of optical storage medium 12. If more than one optical storage medium is to be placed in the receptacle, the thickness of third part 3 may be determined accordingly. Thereby, it is assured that the receptacle has a sufficient height for accommodating optical storage medium 12, so that first and second parts 1, 2 do not have to be bended when optical storage medium 12 is inserted into the receptacle. This may support a high quality appearance of package 100 to the customer. Also, it makes placing the optical storage medium and taking it out of the package more easily due to little frictional forces between the optical storage medium and the side faces of the receptacle.

It is also possible to use additional parts having the shape of third part 3 so that a stack of third parts is formed thereby increasing the height of the receptacle as needed.

Further, package 100 may be designed such that it is particularly suited for specific marketing purposes. For example, in sandwiched region 7, further folding perforations may be provided. Such folding perforations may, for example, allow folding package 100 so as to include a support base for keeping package 100 in an upward position, e.g. when placed upon a table. In such a position, package 100 may be used as a reminder for reminding the customer of using services provided by optical storage medium 12. A corresponding reminder may be marked on package 100, such as "Do not forget to book your next holiday!".

Figure 2:
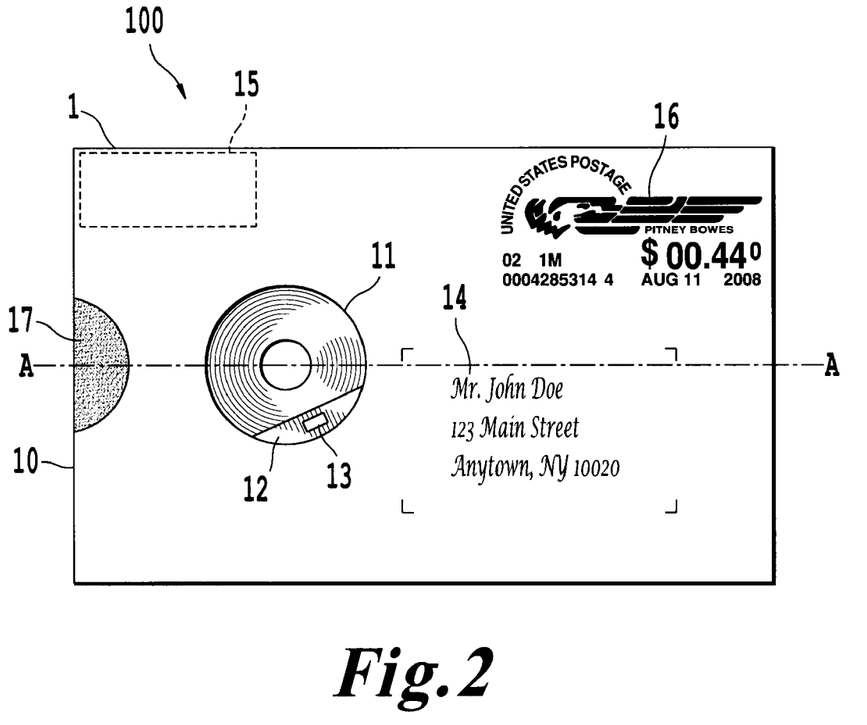
FIG. 2 illustrates an embodiment of a product comprising an embodiment of the package in a folded state assembled with an optical storage medium.

FIG. 2 illustrates an embodiment of a product including package 100 assembled with optical storage medium 12. Package 100 is depicted from a side formed by first part 1 with window 11, through which optical storage medium 12 may be perceived (viewed).

In the embodiment, optical storage medium 12 is held in the receptacle by an adhesive means 17 adhering to first and second parts 1, 2 and extending across at least a part of insertion slot 10. Adhesive means 17 may be designed such that it can easily be opened by a fingernail. For enhancing an optical appearance of package 100, adhesive means 17 may be made of a transparent adhesive tape. Alternatively, adhesive means 17 may be designed as an eye-catcher attracting the customer's interest. Further alternatively, insertion slot 10 may be closed by a further flap provided e.g. formed integrally with first or second part 1, 2, which can be closed by folding.

As optical storage medium 12, a wide variety of data carriers may be used. For example, a CD (compact disc), a CD-ROM, a CD-R, a CD-RW, a super audio CD, a video compact disc, a super video compact disc, a photo CD, a picture CD, a mini CD, a DVD, a DVD-R, a DVD+R, a DVD-RW, a DVD+RW, a DVD-RAM, a DVD-video, a DVD-audio and/or a Blu-Ray disc may be assembled with package 100. Optical storage medium 12 does not have to be of circular shape. It may also have a card shape (i.e. a substantially rectangular shape) or other shapes. In this case the dimensions of the package just need to be changed according to the dimensions of the storage medium.

Optical storage medium 12 may be personalized to a predetermined customer. For example, data related to the customer may be recorded on optical storage medium 12 such that it is readable by standard reading device for optical storage media. The data may be recorded in a predetermined part, e.g. a predetermined sector. As a method for recording personalized data on optical storage medium 12, Post-scribed ID™ may for example be used. The personalizing of optical storage medium 12 may allow carrying out personalized features when optical storage medium 12 is read by the reading device. A personalized feature may comprise greeting the customer by name or connecting him or her to a personalized web-page, for example an order form in which the customer's number and/or postal address is already included.

As illustrated in FIG. 2, personalized information 13 related to the predetermined customer may also be applied on an outer surface of optical storage medium 12, e.g. in the predefined area perceptible through window 11. Personalized information 13 may include, for example, a personalized print attracting the customer's interest to the fact that optical storage medium 12 is personalized to him or her.

Further, personalized information 13 may include a code that can be analyzed automatically. At least a part of personalized information 13 may thus be encoded and applied, for example, as a data matrix code or as a bar code corresponding e.g. to EAN 8.

For supporting an automated analysis of the data matrix code or bar code, it may be useful to provide the code in dark colors, e.g. black, on a bright, e.g. white background.

Alternatively, the code may also be applied in a transparent area of optical storage medium 12, allowing automatic analysis of the code when the transparent area is traversed by a light beam, e.g. if a second window is provided in second part 2, overlapping window 11. Thus, the code may be provided in a transparent region where it does not influence the visible aspect of the product in a disturbing manner.

In case of optical storage medium 12 being of a circular shape, window 11 may be arranged such that a center part of optical storage medium 12 is perceptible. Further, the window may also be of circular shape. In this case, the center part of optical storage medium 12 stays perceptible (visible) when placed in the receptacle, irrespective of a rotational angle of optical storage medium 12 with respect to package 100. In other words, even if optical storage medium 12 is rotated around its center with an arbitrary rotational angle in relation to package 100, before or after insertion into the receptacle, the predefined area of optical storage medium 12 remains perceptible. Therefore, no restrictions on a rotational orientation of optical storage medium 12 must be respected when assembling and transporting package 100 with optical storage medium 12. This significantly facilitates manufacturing processes. The code 13 stays visible at all times.

Further personalized printings or stickers, such as an address sticker 14 indicating the customer's postal address, may be applied to package 100. A personalized greeting may for example be suited for further attracting the customer's interest to the product.

Additional information 15 may also be marked on package 100. This information may for example identify a sender or inform the customer about the content of package 100.

Further, postal information 16, indicating for example that postal charged have been paid, may also be provided.

A product including package 100 assembled with optical storage medium 12, both visibly and the latter electronically personalized, may be suited for attracting the customer's interest. Further, the personalizing of a data content of optical storage medium 12 may allow assisting the customer when using optical storage medium 12. The product may thus be suited for marketing purposes e.g. in bulk mail order business.

Usage of the product for marketing purposes has the further advantage that personalized optical storage media allow measuring a marketing success. For example, when optical storage medium 12 is inserted into a reading device including network access, a connection via network to a central server may established for transmitting marketing-relevant information such as order numbers or an order volume.

Figure 3:
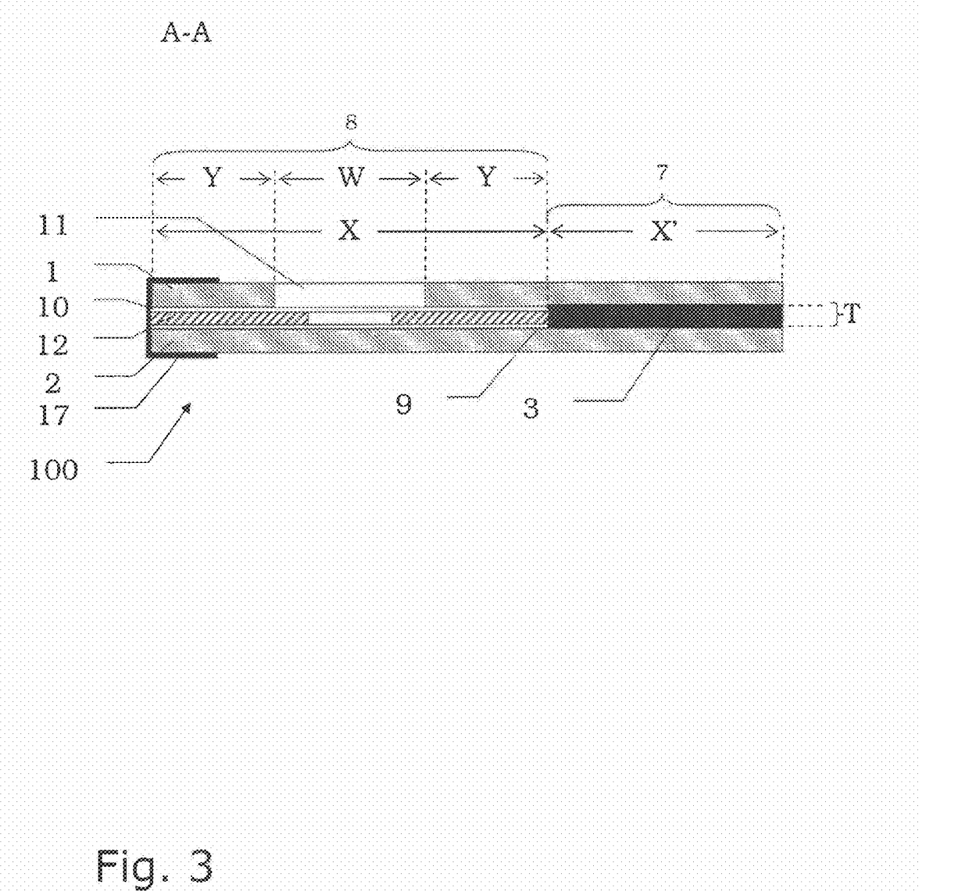
FIG. 3 illustrates a sectional view of the product including an embodiment of the package assembled with the optical storage medium.

FIG. 3 shows a sectional view along line A-A shown indicated in FIG. 2.

In FIG. 3, the sandwiching of third part 3 between first and second parts 1, 2 in sandwiched region 7 is illustrated. In non-sandwiched region 8 of first part 1, however, third part 3 is not sandwiched, such that the receptacle for accommodating optical storage medium 12 is formed.

As illustrated, the receptacle may have a lateral extension X substantially corresponding to a lateral extension of optical storage medium 12. A lateral extension X' of third part 3 may be chosen accordingly.

Consequently, optical storage medium 12 may be entirely accommodated, i.e. fully inserted in the receptacle as shown in FIG. 3. When fully inserted optical storage medium 12 may abut bed stop 9 which may be formed by a cutting edge of third part 3.

As further illustrated, optical storage medium 12 may be held inside the receptacle by adhesive means 17 adhering to first and second parts 1, 2 and extending across insertion slot 10 of the receptacle.

As illustrated, window 11 may for example have a width W, and may be located in a central part of non-sandwiched region 8. Width W may be determined such that a central part of optical storage medium 12, including personalized information 13, is perceptible through window 11 when optical storage medium 12 is entirely accommodated in the receptacle, abutting bed stop 9.

If optical storage medium 12 is, for example, a CD, a DVD or a Blu-Ray disc with a diameter of 120 mm and a standardized center hole, width W of window 11 may be about 45 mm. Lateral extensions Y, as shown in FIG. 3, may in this case be determined at about 37.5 mm, so that window 11 is located centrally in the receptacle, which receptacle may have a total lateral extension of about 120 mm. Tolerances of about 1 mm or more may be accepted.

Further, as illustrated in FIG. 3, a thickness T of third part 3 may substantially correspond to a thickness of optical storage medium 12. It may, however, also be less or more depending on other design criteria of the package. For example, if a light weighted package is to be made, first, second and third parts 1-3 may be made of relatively thin cardboard.

Figure 4:
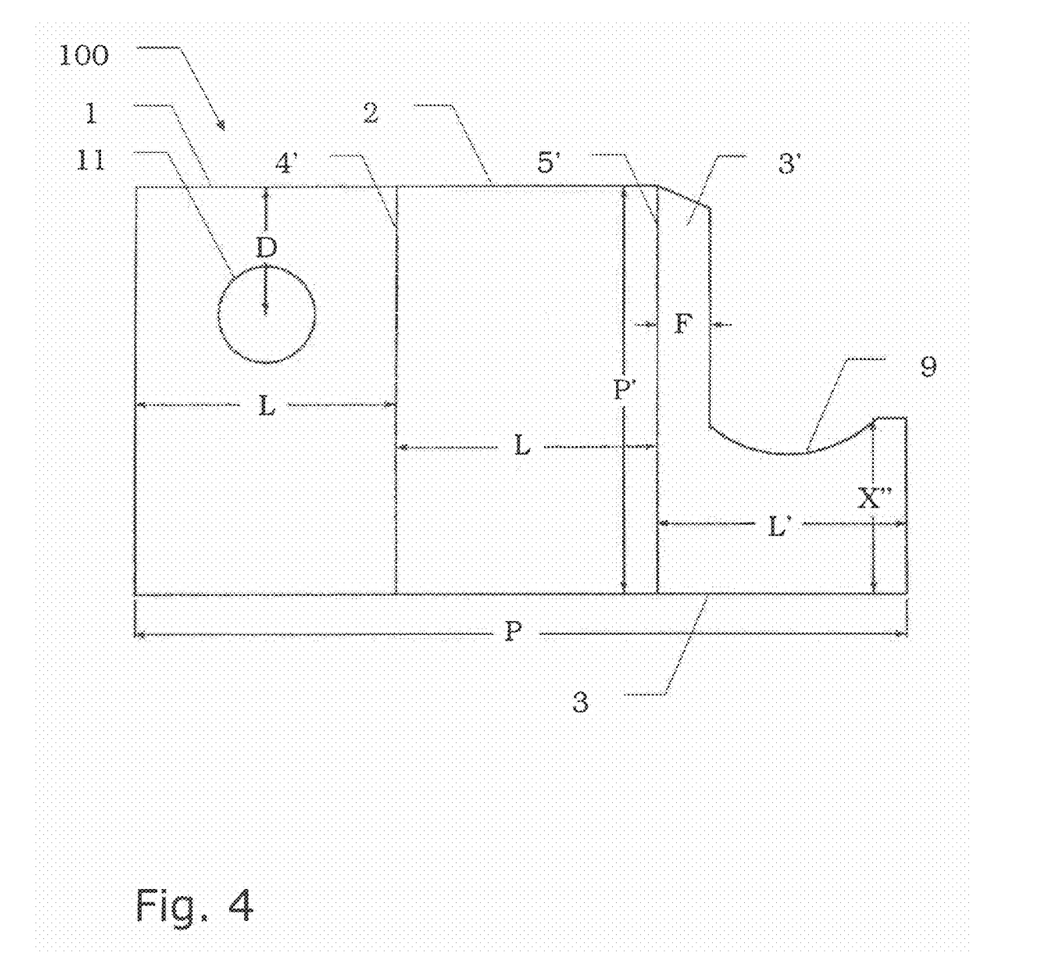
FIG. 4 illustrates a further embodiment of the package in an unfolded state.

In FIG. 4, a further embodiment of package 100 is illustrated. In this embodiment, first, second and third parts 1, 2 and 3 are integrally formed by a single piece of cardboard, the piece having a width P and height P'. By folding the piece of cardboard at folding lines 4' and 5', third part 3 can be sandwiched between first and second parts 1, 2. Thereby, a width L of first and second parts 1, 2 and a width L' of third part 3 is determined.

In the embodiment of package 100, bed stop 9 is formed by a recess of third part 3. At a cutting line of the recess, bed stop 9 of the receptacle is formed.

In a region where optical storage medium 12 is to abut the recess when placed inside the receptacle, the cutting line of the recess substantially has a shape of an arc of a circle. The shape may be determined such that it substantially corresponds to a circumference of optical storage media which are frequently used, such as CDs, CDs with diameter of e.g. 8 cm, DVDs and/or Blu-Ray discs.

The shape of bed stop 9, substantially corresponding to a shape of a circumference of optical storage medium 12, allows placing and holding optical storage medium 12 in a well-defined position in the receptacle. Further, shaping bed stop 9 by a cutting line deviating from a straight line allows stabilizing package 100 by preventing that package 100 may easily be bended or folded in a region of the cutting line.

Further, the recess could also have a form of a funnel opening laterally to insertion slot 10. The recess, in this case, may for example have substantially the shape of a triangle or a trapezium with two sides opening towards insertion slot 10. Bed stop 9 may in this case include the two sides opening towards insertion slot 10. The funnel may hold a small disc with a diameter of e.g. about 8 cm in place while keeping the standard size of the envelope. 8 cm discs are much lighter in weight than 12 cm discs, which may favorably affect the postage rate.

Further in the embodiment shown in FIG. 4, a stabilizing fillet 3' (stabilizing flap) of width F is left when cutting out bed stop 9 of third part 3. The stabilizing fillet 3' may be fixed, e.g. by gluing, to first part 1, thereby stabilizing package 100, preventing unintentional bending or folding. However, stabilizing fillet 3' may not be fixed to second part 2, leaving open the receptacle to accommodate optical storage medium 12. Thereby, stabilizing fillet 3' allows holding optical storage medium 12, when inserted in the receptacle so as to abut bed stop 9, between edges formed at folding lines 4' and 5'. The third part may twist slightly when the optical storage medium is inserted into the cavity to the effect that the storage medium abuts bed stop 9 and rests over stabilizing fillet 3'.

As is further illustrated in FIG. 4, window 11 is located in first part 1 such that a center part of optical storage medium 12 with diameter D is visible.

In the example depicted in FIG. 4, P may be determined at about 368 mm, and P' at about 191 mm. In this case, width L of first and second parts 1, 2 may be determined at about 125 mm, and width L' of third part 3 at about 118 mm. Further, width F of the stabilizing fillet may be determined at about 25 mm, and a sandwiching depth X" at about 82 mm. Diameter D, corresponding to a standard diameter of commonly used optical storage media, may be set at about 60 mm. A radius of window 11 may be set at about 22.5 mm.

As is clear, in order to open the package 100 shown in FIGS. 1-4 the user/customer only needs to tear open the adhesive means 17, i.e. only the adhesive means 17 will be damaged when the package is opened. Thus, the package may be re-used after opening since the package is substantially undestroyed. The user may, therefore, continue using the package after opening e.g. for storing the medium. Also the user could re-use the package for mailing back the medium e.g. if the package is used for disc rental this may be advantageous.

Figure 5:
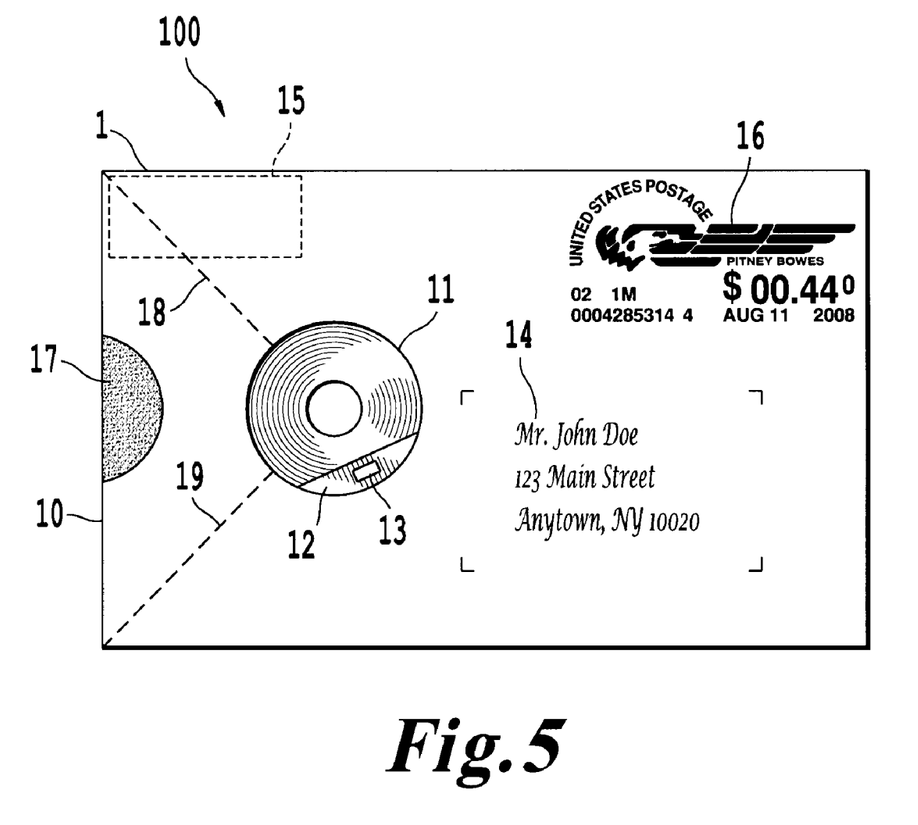
FIG. 5 illustrates a further embodiment of the product including an embodiment of the package with a perforation for opening the package.

In FIG. 5, a further embodiment of package 100 is shown. In this embodiment, two perforations 18, 19 extending from window 11 to insertion slot 10 are provided. Perforations 18 and 19 may be provided e.g. by punching, stamping, cutting or perforating first part 1. For opening package 100, perforations 18, 19 may be ripped or torn off, e.g. with a thumb inserted through window 11. Thus, optical storage medium 12 can easily be removed, i.e. taken out of package 100. The window 11 thereby provides for an easy gripping by e.g. a finger when tearing open the package via the perforations.

If adhesive means 17 is fixed between perforations 18 and 19, a ripped part of first part 1 stays fixed to the remaining parts of package 100. The package may therefore remain, or be thrown away, in one piece. The ripped part may also be flapped back to its initial position for preserving an initial outer appearance of package 100.

Alternatively or in addition, further perforations may be provided in the second part, e.g. extending from the second window to insertion slot 10. In this case, an easy grasping of optical storage means from both sides is possible.

Figure 6:
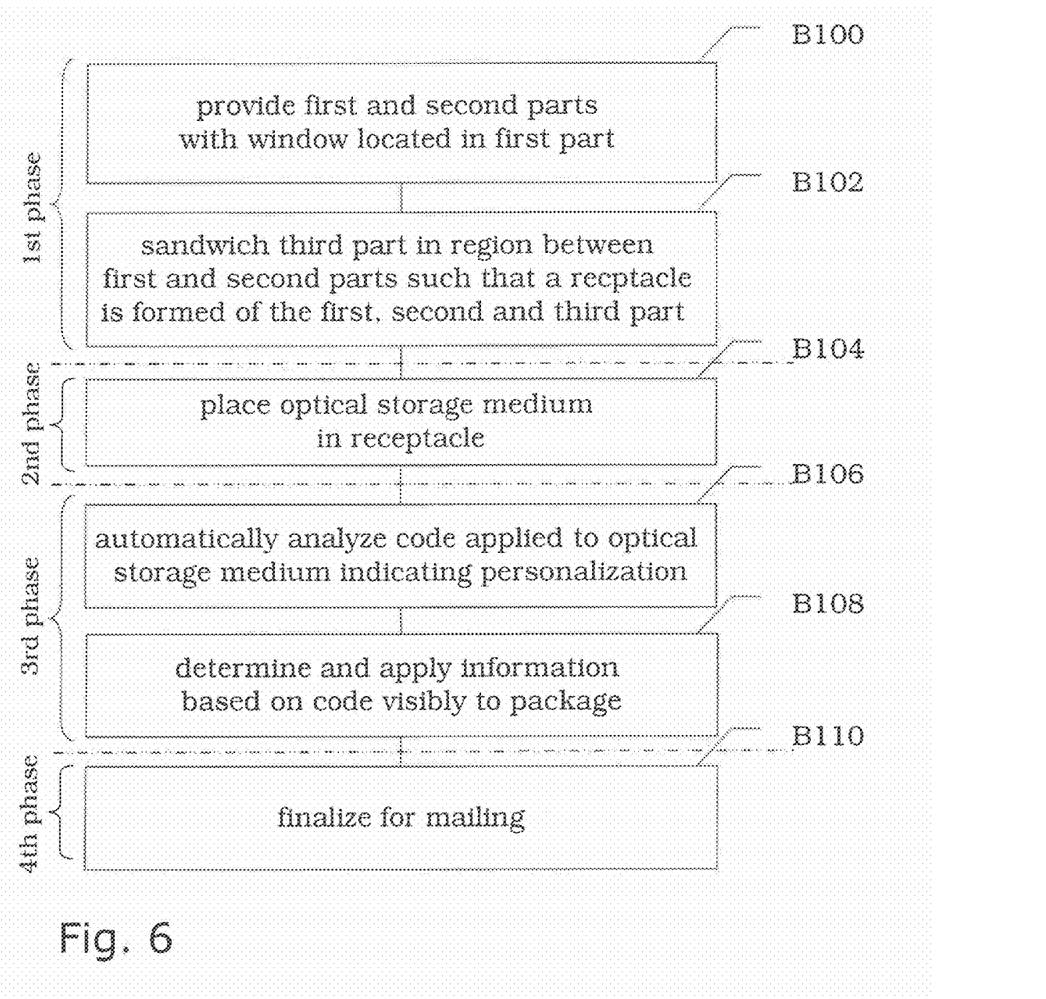
FIG. 6 illustrates an embodiment of a method for manufacturing the product including an embodiment of the package and an optical storage medium.

In FIG. 6, a method for manufacturing the product comprising an embodiment of package 100 and an embodiment of optical storage medium 12 is illustrated.

At B100, first and second parts 1, 2 are provided, with window 11 located in first part 1.

At B 102, third part 3 is sandwiched in sandwiched region 7 between first and second parts 1, 2, such that the receptacle is formed by first, second and third parts 1, 2, 3 in non-sandwiched region 8.

The processes described in blocks B100 and B102 may be realized in a first phase, in which the working of paper or cardboard for manufacturing package 100 is performed. In the first phase, processes like folding, stamping, cutting, gluing and/or adhering may be performed. With these processes, a structure of package 100 may be substantially finished.

At B 104, optical storage medium 12 is placed in the receptacle. Insertion slot 10 may be closed, e.g. by adhering adhesive means 17 to first and second parts 1, 2. Thereby, optical storage medium 12 may be held inside the receptacle.

This process may be seen as a second phase which may be performed separately after the processes of the first phase have been finished. The second phase may be performed, for example, at another machine, in a different manufacturing environment and/or at a later point in time.

Separation of first and second phase allows, for example, waiting before placing optical storage medium until glue and ink applied to package 100 are dry. Any contamination of optical storage medium 12 by contact with freshly applied glue or ink may therefore be avoided.

At B106, the code indicating personalization of optical storage medium 12 to a predetermined customer automatically analyzed. As pointed out in the above, the code may be included in personalized information 13 and therefore automatically perceptible.

At B108, information for personalizing package 100 to the customer is determined and applied perceptibly, e.g. by printing, sticking or engraving it to package 100. This information may comprise, for example, a postal address of the customer.

Blocks B106 and B108 may be included in a third phase of personalizing the package. Since personalized information 13 provided on optical storage medium 12 is perceptible through window 11, the processes of the third phase may be performed separately after finishing the processes of the first and second phase. For example, the processes of the third phase may be performed at another machine, in another manufacturing environment such as a letter shop, and at a later point in time.

At B110, package 100 is finalized for mailing. This process may be performed with respect to local mailing standards, and may include franking package 100, e.g. in accordance with franking requirements of a destination country.

This process may be regarded as forming a fourth phase, and may be performed separately from the other phases, e.g. on another machine, in another manufacturing environment such as a local letter shop and/or at a different point in time.

Figure 7:
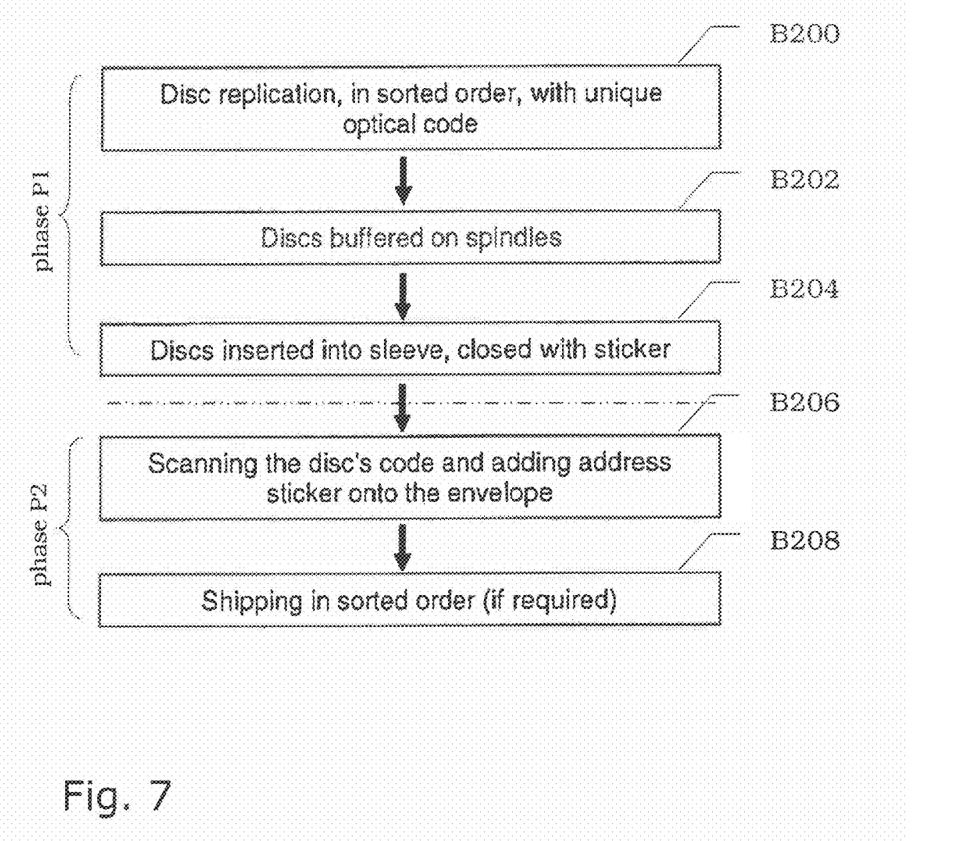
FIG. 7 illustrates a further embodiment of the method for manufacturing the product.

A further embodiment of a manufacturing method of a product comprising an embodiment of package 100 and an embodiment of optical storage medium 12 is illustrated in FIG. 7. At B200, discs are replicated, e.g. in sorted order with a unique optical code, personalizing the discs for designated customers. At B202, the discs are buffered on spindles. At B204, the discs are inserted into sleeves corresponding to embodiments of package 100. The sleeves are closed with stickers.

The processes performed at blocks B200, B202 and B204 may be included in a phase P1 and may be performed e.g. in a disc manufacturing environment.

At B206, the disc's code is scanned, and a corresponding address sticker is provided. This sticker is applied to the sleeve forming an envelope for postal transfer. At B208, the envelopes are shipped, e.g. in sorted order, for different destination countries.

Procedures of B206 and B208 may be performed in a further, separate phase P2, e.g. at a letter shop or mailing center particularly suited for bulk mail services and accustomed with local mailing standards.

The division of manufacturing procedures into a plurality of separate phases, as described in the above, is possible due to the design of package 100 as described in the above, allowing manufacturing in separate steps. This allows flexible design of the manufacturing processes including an outsourcing of the separate phases to manufacturing environments particularly suited for performing the manufacturing processes. Thus, manufacturing knowledge, mailing standards and transport capacities may be efficiently used.

The invention claimed is:

1. Package, comprising:
   first and second parts;
   a window located in the first part;
   a third part sandwiched in a region between the first and second parts,
   wherein the first, second and third parts define a receptacle adapted to receive an optical storage medium for storing electronically derivable data, wherein the receptacle is located in a non-sandwiched region where the third part is not sandwiched between the first and second parts,
   wherein the window and the third part are arranged such that when the optical storage medium is placed in the receptacle, the optical storage medium abuts the third part and a predefined area of the optical storage medium is perceptible through the window, and
   wherein an insertion slot forming an opening of the receptacle is provided by leaving open lateral edges of the first and second parts, the insertion slot being provided on a lateral side of the receptacle, the lateral side being opposite to a region where the optical storage medium abuts the third part when placed inside the receptacle.

2. Package according to claim 1, wherein the receptacle has a size such that the receptacle entirely accommodates the optical storage medium.

3. Package according to claim 1, wherein the first and second part are integrally formed by a single piece of cardboard or paper.

4. Package according to claim 1, wherein the first, second and third parts are integrally formed by a single piece of cardboard or paper.

5. Package according to claim 1, wherein the third part has a thickness substantially corresponding to a thickness of the optical storage medium.

6. Package according to claim 1, wherein the window is of a circular shape and arranged such that a center part of the optical storage medium is perceptible through the window.

7. Package according to claim 1,
   wherein the third part comprises a recess forming a bedstop, and
   wherein the recess, in the region where the optical storage medium abuts when placed inside the receptacle, substantially has a shape of a circumference of the optical storage medium.

8. Package according to claim 1, comprising;
   an adhesive means adhering to the first and second parts and extending across the opening of the receptacle such that optical storage medium is held inside the receptacle.

9. Package according to claim 1, comprising:
   a perforation extending from the window to the opening of the receptacle.

10. Package according to claim 9, comprising:
    a further perforation extending from the window to the opening, the perforation extending on a first side of the adhesive means and the further perforation extending on a second side of the adhesive means.

11. Product comprising:
    a package for an optical storage medium for storing electronically derivable data, the package including first and second parts; a window located in the first part; a third part sandwiched in a region between the first and second parts; wherein the first, second and third parts define a receptacle in a non-sandwiched region where the third part is not sandwiched between first and second parts; wherein the window and the third part are arranged such that when the optical storage medium is placed in the receptacle, the optical storage medium abuts the third part and a predefined area of the optical storage medium is perceptible through the window, wherein an insertion slot forming an opening of the receptacle is provided by leaving open lateral edges of the first and second parts, the insertion slot being provided on a lateral side of the receptacle, the lateral side being opposite to a region where the optical storage medium abuts the third part when placed inside the receptacle; and
    an optical storage medium,
    wherein the optical storage medium has a machine readable code marked in the predefined area perceptible through the window, and
    wherein the package comprises information related to the code.

12. Product according to claim 11, wherein the information related to the code comprises a name and/or postal address of a person to whom the optical storage medium is personalized.

13. Method for manufacturing a product, comprising:
    providing first and second parts, wherein a window is located in the first part; and
    sandwiching a third part in a region between the first and second parts, wherein a receptacle is formed of the first, second and third parts in a non-sandwiched region where the third part is not sandwiched between the first and second parts,
    wherein the window and the third part are arranged such that when an optical storage medium for storing electronically derivable data is placed in the receptacle, the optical storage medium abuts the third part and a predefined area of the optical storage medium is perceptible through the window, and
    wherein an insertion slot forming an opening of the receptacle is provided by leaving open lateral edges of the first and second parts, the insertion slot being provided on a lateral side of the receptacle, the lateral side being opposite to a region where the-optical storage medium abuts the third part when placed inside the receptacle.

14. Method for manufacturing a product according to claim 13, wherein the optical storage medium is placed in the receptacle separately after the step of providing and the step of sandwiching.

15. Method for manufacturing a product according to claim 13, further comprising:
automatically analyzing a code applied to the optical storage medium, which code is perceptible through the window and indicates a personalization of the optical storage medium to a predetermined user;
determining information for personalizing the package to the user based on the code; and
applying the information onto the package.

* * * * *